United States Patent [19]
Nakajima et al.

[11] Patent Number: 5,394,548
[45] Date of Patent: Feb. 28, 1995

[54] MULTI-MEDIA SCHEDULING SYSTEM

[75] Inventors: Jun Nakajima; Masatomo Yazaki, both of Kawasaki, Japan

[73] Assignee: Fujitsu Limited, Kawasaki, Japan

[21] Appl. No.: 958,741

[22] Filed: Oct. 9, 1992

[51] Int. Cl.$^6$ .............................................. G06F 9/06
[52] U.S. Cl. .................... 395/650; 395/154; 364/DIG. 1; 364/281.8
[58] Field of Search ................. 395/154, 650; 364/DIG. 1 MS File

[56] References Cited

U.S. PATENT DOCUMENTS 4,642,756  2/1987  Sherrod .................. 364/DIG. 1
5,210,872  5/1993  Ferguson et al. ............. 395/650

OTHER PUBLICATIONS

Herrtwich, "Betriebsmittelvergabe unter Echzeitgesichtspunkten," *Informatik Spektrum,* vol. 14, No. 3, Jun. 1991, Berlin, DE, pp. 123–136, XP000209516.

Harbour et al., "Fixed Priority Scheduling of Periodic Tasks with Varying Execution Priority," *12th Real-Time Systems Symposium,* Dec. 4, 1991, San Antonio, Tex. pp. 116–128, XP000337216.

Miller, "The Performance of a Mixed Priority Real-Time Scheduling Algorithm," *Operating Systems Review (Signops),* vol. 26, No. 4, Oct. 1992, New York, N.Y., pp. 5–13, XP000330577.

Primary Examiner—Thomas M. Heckler
Attorney, Agent, or Firm—Staas & Halsey

[57] ABSTRACT

A multi-media scheduling system for scheduling multi-media applications which include media having priorities based on time restrictions. The multi-media scheduling system includes a managing unit for managing requests of each of the media of the multi-media applications, a sorter for rearranging the requests managed by the managing unit in a sequence starting from a request having a strongest time restriction, and a preemptive scheduler for scheduling the rearranged requests in the managing unit by reducing priority of at least one request which has a predetermined priority information lower than a predetermined value if the time restriction of the media prevents desired scheduling, where the predetermined priority information is selected from at least a group of information consisting of a quality which indicates a tolerance of a delay from a request time of each request and an importance which indicates an importance of each request.

8 Claims, 6 Drawing Sheets

FIG.3

| THREAD | DEADLINE (ms) | EVALUATION TIME (ms) | TYPE | QUALITY | IMPORTANCE |
|---|---|---|---|---|---|
| graphic display | 20 | 10 | D | - | 7 |
| MIDI1 | 30 | 5(10) | E | 5 | 10 |
| MIDI2 | 30 | 5 | E | 10 | 15 |
| PCM | 35 | 10 | D | - | 5 |

| SEQUENCE OF PROCESS | START TIME | ESTIMATED END TIME | THREAD |
|---|---|---|---|
| 1 | 0 | 5 | MIDI 2 |
| 2 | 5 | 10 | MIDI 1 |
| 3 | 10 | 20 | graphic display |
| 4 | 20 | 30 | PCM |

(B)

| SEQUENCE OF PROCESS | START TIME | ESTIMATED END TIME | THREAD |
|---|---|---|---|
| 1 | 0 | 5 | MIDI 2 |
| 2 | 5 | 15 | graphic display |
| 3 | 15 | 25 | MIDI 1 |
| 4 | 25 | 35 | PCM |

FIG.6

| SEQUENCE OF PROCESS | START TIME | ESTIMATED END TIME | THREAD |
|---|---|---|---|
| 1 | 0 | 5 | MIDI2 |
| 2 | 5 | 15 | MIDI1 |
| 3 | 15 | 25 | graphic display |
| 4 | 20 | 30 | PCM |

MULTI-MEDIA SCHEDULING SYSTEM

BACKGROUND OF THE INVENTION

The present invention generally relates to multi-media scheduling systems, and more particularly to a multi-media scheduling system which schedules multi-media applications using an operating system of a computer.

There exists a strong demand to develop and execute multi-media applications in existing operating system to improve the human interface. For example, sound or music, which is a kind of medium, is realized by transmitting data and commands to a device with accurate timings. In this case, if the operation to the device is delayed, the original rhythm of the music is lost. Accordingly, unlike the existing applications, the multi-media applications must guarantee continuity of each media.

The scheduling of the conventional operating system is carried out based on priority. The scheduling is such that program execution is made in sequence starting from the program with the highest priority.

If the scheduling of the multi-media applications is made based on the priority, the application of the medium having the greatest time restriction must be treated as having the highest priority. However, although the scheduling of multi-media applications may be possible for a small number of media, the conventional scheduling system cannot cope with the scheduling of multi-media applications if the number of media is large. If the number of media is large, the data processing capability of the computer becomes limited and there is a problem in that it no longer becomes possible to satisfy the time restriction of each medium.

Accordingly, there is a demand to realize a scheduling system which can satisfactorily schedule multi-media applications while satisfying the time restriction of each medium, even when the number of media is large.

SUMMARY OF THE INVENTION

Accordingly, it is a general object of the present invention to provide a novel and useful multi-media scheduling system in which the problem described above are eliminated.

Another and more specific object of the present invention is to provide a multi-media scheduling system for scheduling multi-media applications which include media having priorities based on time restrictions, comprising managing means for managing requests of each of the media of the multi-media applications, sorting means, coupled to the managing means, for rearranging the requests managed by the managing means in a sequence starting from a request having a strongest time restriction, and preemptive scheduler means, coupled to the managing means, for scheduling the rearranged requests in the managing means by reducing priority of at least one request which has a predetermined priority information lower than a predetermined value if the time restriction of the media prevents desired scheduling, where the predetermined priority information is selected from at least a group of information consisting of a quality which indicates a tolerance of a delay from a request time of each request and an importance which indicates an importance of each request. According to the multi-media scheduling system of the present invention, it is possible to make a dynamic scheduling to depending on the quality and importance to suit the character of each medium. In addition, even if the time restriction of the media cannot be satisfied, it is possible to take measures so that quality deterioration is inconspicuous to the human eyes or ears. In other words, it facilitates the building of a highly reliable application without deteriorating the apparent quality of each medium.

Other objects and further features of the present invention will be apparent from the following detailed description when read in conjunction with the accompanying drawings.

BRIEF DESCRIPTION OF THE DRAWINGS

FIGS.3 and 4 are diagrams explaining the operation of the first embodiment of the scheduling process;

FIG.6 is a diagram explaining the operation of the second embodiment of the scheduling process.

DESCRIPTION OF THE PREFERRED EMBODIMENTS

Figure 1:
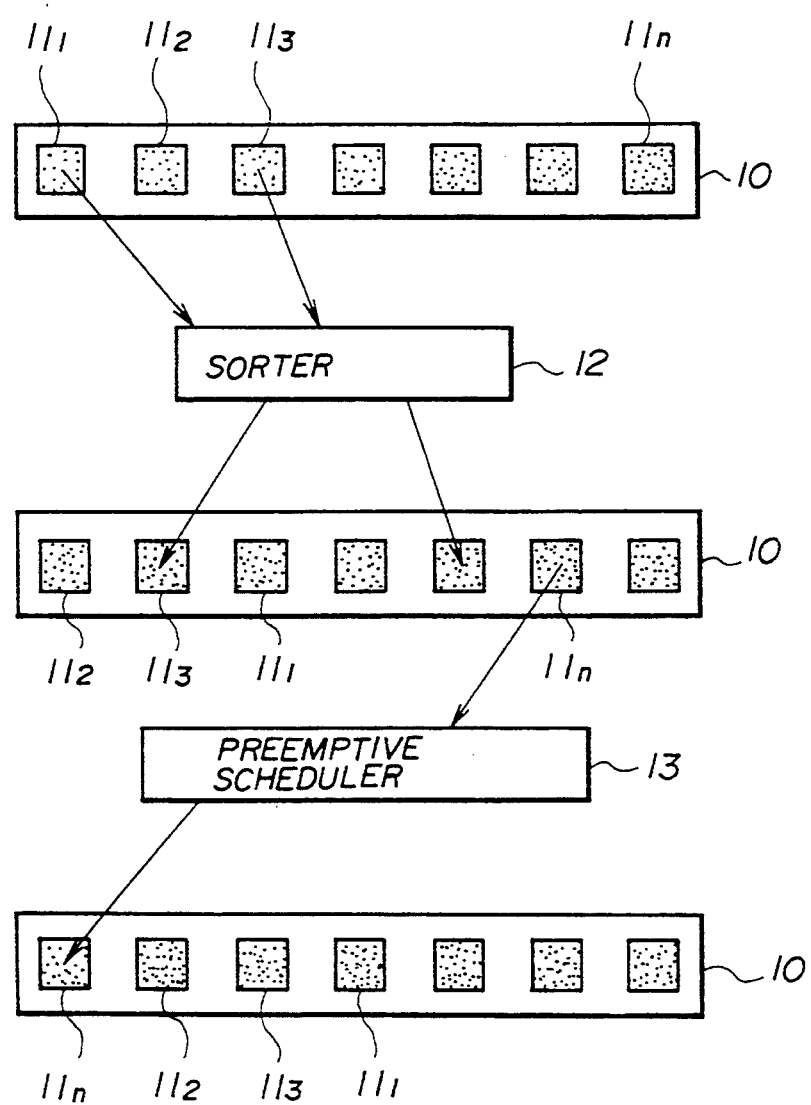
FIG.1 is a system block diagram showing an embodiment of a multi-media scheduling system according to the present invention.

FIG.1 shows an embodiment of a multi-media scheduling system according to the present invention. In FIG.1, a thread managing unit 10 manages threads $11_1$ through $11_n$ which are requesting scheduling. Threads $11_1$ through $11_n$ are the request of each medium of the multi-media applications.

Each thread Thi has a deadline Di by which time the process must be ended, an evaluation time Ci which is a maximum predicted calculation time required for this process, a medium character Fi which indicates the character of the medium, an importance Wi, and a quality Qi. The medium character Fi indicates whether the medium is a D-type medium which has a deadline or an E-type medium which has no deadline but must be started immediately upon request. These deadline Di, evaluation time Ci, medium character Fi, importance Wi and quality Qi of the thread Thi are managed by the thread managing unit 10.

Multi-media applications deal with a human operator, and thus, the multi-media applications permit a constant delay for each medium. For example, the human ear cannot detect a delay of sound on the order of 10 msec, and such thus a delay of sound can be permitted. On the other hand, the human eye cannot detect a delay of display of 10 msec or even more, and thus such a delay of display can also be permitted. An E-type medium has such a delay tolerance, and a tolerance of the delay from the time of request of each E-type medium is indicated by the quality Qi. In other words, the medium having a high quality Qi is scheduled with a short delay from the time of the request.

On the other hand, batch processing may be carried out periodically depending on the media, but the processing will not be carried out if the preparation is delayed before the start of the processing. In such media, scheduling is handles by reducing the priority of the medium which has lowest importance Wi if the scheduling using the importance Wi becomes impossible.

A thread sorter 12 shown in FIG.1 rearranges the threads $11_1$ through $11_n$ which are managed by the thread managing unit 10 in a sequence starting from the thread having the strongest time restriction, that is, starting from the thread having the smallest deadline $D_i$.

A preemptive scheduler 13 schedules to the rearranged threads $11_1$ through $11_n$ so that each D-type thread can meet the deadline $D_i$ while giving priority to each E-type thread if there is a time margin and time permits. If there is no time margin and some D-type threads will not meet the deadlines $D_i$ if the E-type threads are given the priority, it is possible to take either of the following steps. First, it is possible to reduce the priority of the E-type threads and delay the scheduling of the E-type threads so that each D-type thread can meet the deadline $D_i$. Second, it is also possible to give priority to the E-type threads and therefore not meet the deadlines $D_i$ of some of the D-type threads.

Figure 2:
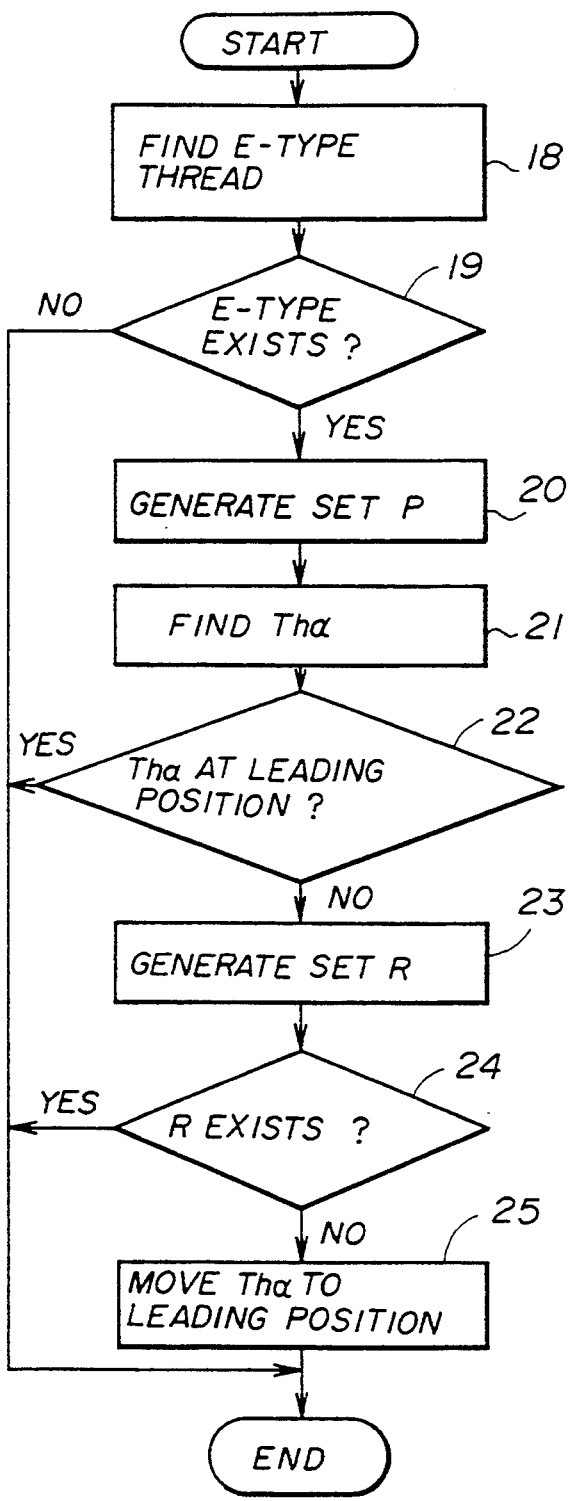
FIG.2 is a flow chart explaining a first embodiment of a scheduling process.

FIG.2 is a flow chart showing a first embodiment of a scheduling process which is carried out by the preemptive scheduler 13.

In FIG.2, a step 18 finds the E-type threads from the threads $11_1$ through $11_n$ which are managed by the thread managing unit 10. A step 19 decides whether or not an E-type thread is found, and the process is ended if the decision result is NO. On the other hand, if the decision result is YES, a step 20 generates a set P of the positions of each of the E-type threads which are found.

A step 21 finds a thread $Th\alpha$ having the largest quality $Q_i$ out of the E-type threads which are indicated by each of the positions of the set P, based on the following formula (1).

$$Q\alpha = \max_{i \in P} Q_i \qquad (1)$$

A step 22 decides whether or not the thread $Th\alpha$ is located at the leading position in the thread managing unit 10. The process is ended if the decision result in the step 22 is YES. But if the decision result in the step 22 is NO, the process advances to a step 23.

The step 23 finds a D-type thread $Th_k$ which is located on the leading side of the thread $Th\alpha$ which is managed by the thread managing unit 10, and is such that the evaluation time $C\alpha$ of the thread $Th\alpha$ is larger than the time margin to the deadline $D_k$ of the thread $Th_k$, based on the following formula (2), and generates a set R of the positions of each of the threads $Th_k$.

$$C\alpha > D_k - \sum_{i=0}^{k} C_i - (\text{Present Time}) \qquad (2)$$

The above time margin to the deadline $D_k$ is a value which is obtained by subtracting a sum of the evaluation times $C_i$ of all threads located at a position on the leading side of the thread $Th_k$ and the present time from the deadline $D_k$ of the thread $Th_k$.

A step 24 decides whether or not the set R exists, and the process is ended if the decision result in the step 24 is YES. On the other hand, if the decision result in the step 24 is NO, a step 25 moves the thread $Th\alpha$ to the leading position in the thread managing unit 10 and ends the process.

FIG.3 shows four threads "graphic display" "MIDI1", "MIDI2" and "PCM" being managed in the thread managing unit 10 (shown in FIG.1) If the evaluation time $C_i$ for the thread "MIDI1" is 5 msec, this embodiment schedules by setting the present time to "0" and processing each thread in the sequence shown in FIG.4 (A). "MIDI" is the abbreviation for "musical instrument digital interface".

Further, if the evaluation time $C_i$ for the thread "MIDI1" is 10 msec as indicated in brackets in FIG.3, the thread "graphic display" cannot meet the deadline $D_i$ which is 10 msec. Hence, in this case, the priority of the thread "MIDI1" is reduced because the thread "MIDI1" is a medium having a lower quality, and this embodiment makes the scheduling by processing each thread in the sequence shown in FIG.4 (B).

Figure 5:
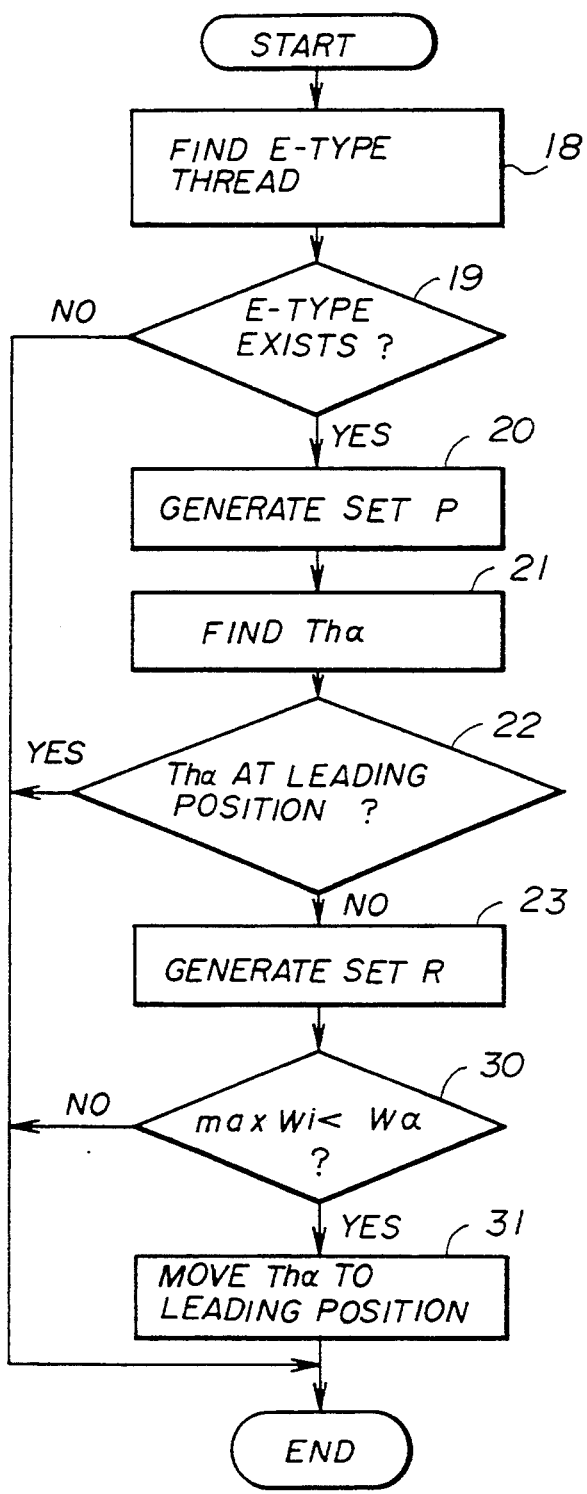
FIG.5 is a flow chart explaining a second embodiment of the scheduling process.

FIG.5 is a flow chart showing a second embodiment of the scheduling process which is carried out by the preemptive scheduler 13 (shown in FIG.1). In FIG.5, those steps which are the same as those corresponding steps in FIG.2 are designated by the same reference numerals, and a description thereof will be omitted. In FIG.5, steps 30 and 31 are provided in place of the steps 24 and 25 shown in FIG.2.

The step 30 decides whether or not there exists in the threads, which are indicated by each of the positions of the set R, a thread which has an importance $W_i$ which is smaller than the importance $W\alpha$ of the thread $Th\alpha$, based on the following formula (3).

$$\max_{i \in Q} W_i < W\alpha \qquad (3)$$

The process is ended if the decision result in the step 30 is NO. On the other hand, if the decision result in the step 30 is YES, the step 31 moves the thread $Th\alpha$ to the leading position in the thread managing unit 10.

If the evaluation time $C_i$ for the thread "MIDI1" is 10 msec in FIG.3, the deadline $D_i$ of the thread "graphic display" cannot be met. However, because the importance $W_i$ of the thread "MIDI1" is high, the thread "MIDI1" is given priority, and this embodiment makes the scheduling by processing each thread in the sequence shown in FIG.6. In this case, the thread "graphic display" is not processed on time, however, one field of the image cannot be sensed by the human eyes even if it is not displayed, and there is no deterioration of the apparent image quality. On the other hand, the human ears are more sensitive in that the synchronization error of sound is more easily detected.

Further, the present invention is not limited to these embodiments, but various variations and modifications may be made without departing from the scope of the present invention.

What is claimed is:

1. A multi-media scheduling system for scheduling multi-media applications which include media having predetermined priority information being dictated by time restrictions for processing the media, said multi-media scheduling system comprising:

managing means for managing requests of the multi-media applications for processing the media;

sorting means, coupled to said managing means, for rearranging the requests in a sequence starting from a request having the most restrictive time restriction; and preemptive scheduler means, coupled to said managing means, for scheduling the rearranged requests for processing by reducing priority of at least one request in which said predetermined priority information is lower than a predetermined value if the time restriction of the media prevents desired scheduling of replay, said predetermined priority information being selected from a group of information consisting of a quality which indicates a tolerance of a delay from a request time for processing of each request and an importance which indicates an importance of each request.

2. The multi-media scheduling system as claimed in claim 1, wherein each request of the multi-media application for a processing of a media further has information including a deadline which indicates a time by which a process must be ended, an evaluation time which is a maximum predicted calculation time required for the process, and a medium character which indicates a type of medium to which the media belongs.

3. The multi-media scheduling system as claimed in claim 2, wherein the medium character indicates whether the medium is a D-type medium which has a deadline or an E-type medium which has no deadline but the process must be started immediately upon request.

4. The multi-media scheduling system as claimed in claim 3, wherein said preemptive scheduler means makes the scheduling with respect to the rearranged requests so that each request of the D-type medium can meet the deadline while giving priority to each request of the E-type medium if there is a time margin and time permits.

5. The multi-media scheduling system as claimed in claim 4, wherein said preemptive scheduler means reduces the priority of the requests of the E-type media and delays the scheduling of the requests of the E-type media so that each request of the D-type media can meet the deadline or, makes the scheduling by giving priority to the requests of the E-type media and not meet the deadlines of some of the requests of the D-type media, if there is no time margin and some requests of the D-type media will not meet the deadlines if the requests of the E-type media are given the priority.

6. The multi-media scheduling system as claimed in claim 3, further comprising:

each request of the multi-media application further includes a quality indicator Qi indicative of the relative quality of the media; and said preemptive scheduler means includes:

means for finding requests of the E-type media from the requests which are managed by said managing means;

means for generating a set P of positions of each of the requests of the E-type media which are found;

means for finding a request $T_{h\alpha}$ having a largest quality indicator Qi out of the requests of the E-type media which are indicated by each of the positions of the set P, based on the formula $$Q\alpha = \max_{i \in P} Qi$$

means for finding a request $T_{hk}$ of the D-type medium which is located prior to $T_{h\alpha}$ in, said managing means, and is such that the evaluation time $C\alpha$ of the request $T_{h\alpha}$ is larger than a time margin to a deadline Dk of the request $T_{hk}$, based on the formula $$C\alpha > Dk - \sum_{i=o}^{k} Ci - (\text{Present Time})$$

where the time margin to the deadline Dk is a value which is obtained by subtracting a sum of the evaluation times Ci of all requests located at a position on the leading side of the request $T_{hk}$ and the present time from the deadline Dk of the request $T_{hk}$, and for generating a set R of the positions of each of the requests $T_{hk}$ if no request that $T_{h\alpha}$ is located at the leading position in said thread managing means; and means for the request $T_{h\alpha}$ to the leading position in said managing means if no set R exists.

7. The multi-media scheduling system as claimed in claim 3, further comprising:

each request of the multi-media application further includes a quality indicator Qi indicative of the relative quality of the media; and said preemptive scheduler means includes:

means for finding requests of the E-type media from the requests which are managed by said managing means;

means for generating a set P of positions of each of the requests of the E-type media which are found;

means for finding a request $T_{h\alpha}$ having a largest quality indicator Qi out of the requests of the E-type media which are indicated by each of the positions of the set P, based on the formula $$Q\alpha = \max_{i \in P} Qi$$

means for finding a request $T_{hk}$ of the D-type medium which is located prior to the request $T_{h\alpha}$ in said managing means, and is such that the evaluation time $C\alpha$ of the request $T_{h\alpha}$ is larger than a time margin to a deadline Dk of the request $T_{hk}$, based on the formula $$C\alpha > Dk - \sum_{i=o}^{k} Ci - (\text{Present Time})$$

where the time margin to the deadline Dk is a value which is obtained by subtracting a sum of the evaluation times Ci of all requests located at a position on the leading side of the request $T_{hk}$ and the present time from the deadline Dk of the request $T_{hk}$ and for generating a set R of the positions of each of the requests $T_{hk}$ if no request $T_{h\alpha}$ is located at the leading position in said thread managing means; and means for moving the request $T_{h\alpha}$ to the leading position in said managing means if there exists in the requests which are indicated by each of the positions of the set R a request which has an importance Wi which is smaller than an importance $W\alpha$ of the request $T_{h\alpha}$, based on the following formula $$\max_{i \in Q} Wi < W\alpha.$$

8. The multi-media scheduling system as claimed in claim 1, which is contained in an operating system of a computer.

* * * * *

UNITED STATES PATENT AND TRADEMARK OFFICE
CERTIFICATE OF CORRECTION

PATENT NO. : 5,394,548
DATED : February 28, 1995
INVENTOR(S) : Jun NAKAJIMA, et al.

It is certified that error appears in the above-indentified patent and that said Letters Patent is hereby corrected as shown below:

Title Page, "OTHER PUBLICATIONS", line 1, change "Eschzeit" to --Echtzeit--.

Col. 2, line 53, change "such this" to --thus such--; and
line 66, change "handles" to --handled--; and
line 67, change "has lowest" to --has the lowest--; and
line 67, delete "the".

Col. 3, line 7, delete "to".

Signed and Sealed this

Thirteenth Day of June, 1995

Attest:

BRUCE LEHMAN

Attesting Officer

Commissioner of Patents and Trademarks